Feb. 14, 1933.  A. V. DE FOREST  1,897,634
METHOD OF AND APPARATUS FOR ELECTROMAGNETIC TESTING
Original Filed July 24, 1923  3 Sheets-Sheet 1

INVENTOR.
Alfred V de Forest
BY
ATTORNEY.

Feb. 14, 1933.  A. V. DE FOREST  1,897,634
METHOD OF AND APPARATUS FOR ELECTROMAGNETIC TESTING
Original Filed July 24, 1923  3 Sheets-Sheet 2

INVENTOR.

ATTORNEY.

Patented Feb. 14, 1933

1,897,634

UNITED STATES PATENT OFFICE

ALFRED V. DE FOREST, OF SOUTHPORT, CONNECTICUT, ASSIGNOR TO AMERICAN CHAIN COMPANY, INC., A CORPORATION OF NEW YORK

METHOD OF AND APPARATUS FOR ELECTROMAGNETIC TESTING

Application filed July 24, 1923, Serial No. 653,455. Renewed October 23, 1929.

My invention relates to methods of and means for testing those magnetic and electrical properties of materials which influence the effects produced by the materials when they form part of an electro-magnetic circuit and drawing from the results obtained information as to the mechanical properties of the materials and their consequent usefulness for given purposes. This application contains matter taken from my abandoned application Serial 449,765, filed March 5, 1921.

It is a matter of common knowledge that there is a relation between the magnetic and certain mechanical characteristics of magnetic materials and also that there is a relation between the electrical resistance and certain mechanical characteristics of all metallic materials. When the material under test is ferro-magnetic, the results of a straight electrical resistance test may give valuable information as to certain mechanical characteristics, and the results of a magnetic test may give equally valuable information as to certain mechanical characteristics, but not necessarily the same characteristics which influence the results in the resistance test, and vice versa. To illustrate: In common carbon steel wire, not heat-treated, there are two principal variables which affect the hardness, tensile strength and elastic limit. One is the amount of cold work, which is a function of the reduction in cross-sectional area of the wire since its last anneal. The other is the chemical composition of the steel, particularly as regards its percentage of carbon. Now the magnetic hysteresis of steel wire is markedly influenced by the degree of cold work, but to a relatively small extent only by composition. On the other hand, the electrical resistance is much more affected by the composition than by the amount of cold working which the wire has received. Of the two forms of test the magnetic has in general appeared to offer the greater number of advantages, but striking inconsistencies in attempted correlation between magnetic and mechanical characteristics have always been marked.

Also, materials alike with respect to one magnetic characteristic may be unlike with respect to another. If we attempt a correlation between the magnetic and mechanical properties of a ferrous material based upon measurements of permeability, such comparison is ordinarily made upon the basis of the permeability at a definite value of magnetizing force or of magnetic induction, since magnetic permeability is a function of the ratio of the two quantities. But while the respective permeabilities of two specimens may be alike at a definite value of either magnetizing force or induction, they may be like or unlike at another value of force or induction. When they are unlike, it is indicative of a difference between the two with respect to some mechanical property which may or may not be of moment, depending upon the conditions of practical use of the specimens. Similarly, it is of course possible for two specimens to have the same permeability at one definite value of force or induction and yet have quite different hysteresis values, and so on. Again, two specimens can have similar inherent magnetic characteristics and yet apparently differ in such characteristics because under the necessary or desired conditions of experiment other factors enter in due to the method of measurement employed. For example, in testing materials under alternating magnetomotive forces, the shielding effects of eddy currents or changes in wave form modify the magnetic phenoma observed and such modification varies in degree as the magnetizing force or induction is varied. This modification in magnetic characterestcs may be termed "apparent" or "effective."

In the use of my invention I employ novel means for correlating the various properties of materials in which the magnetic and electrical characteristics of a material under one or more conditions of experiment may be readily observed. Particularly do I employ means whereby specimens having different characteristics because of different intrinsic mechanical properties may be made to exhibit apparently like characteristics under one condition of experiment, in order to facilitate the bringing out more clearly their actual differences when the original condition of experiment is altered. This latter point is best illustrated by citing an example of a test which has been found entirely practicable. Consider two specimens of cold rolled steel having the same degree of cold working, with respect to working down from one size to another, but differing materially in amount of carbon content. Magnetic tests of any character, as usually carried out, would be expected to disclose different magnetic characteristics for these specimens, but would not be capable of properly isolating and determining the influence of the carbon content alone and apart from that characteristic pertaining to cold working. I can, for example, by the use of my invention, so adjust the conditions of experiment that the particular magnetic phenomena which I have found to be indicative of cold working may be similar for the two specimens, leaving the difference in carbon content to be the more clearly demonstrated under a second condition of experiment. The form of magnetic testing which I have devised, therefore, in addition to other important advantages permits me to isolate, and render the apparatus more sensitive to, the influence of one or more inherent or effective magnetic characteristics of a material in the process of estimating its mechanical characteristics.

Bearing in mind that the electrical conductivity and the purely magnetic characteristics are affected differently by different mechanical characteristics, it will be apparent that it is highly desirable to have available a method of weighing the electrical and magnetic effects observed in a test for correlating properties, and the object of my invention is to provide a method and means whereby a plurality of coordinated tests can be made, to properly identify different physical or chemical properties of a material.

In the form of test which I am about to describe, I prefer to employ for magnetizing the materials under test currents which are either alternating or uni-directional, but always variable in value. Under the influence of such variable currents, the electrical properties, such as the resistance for example, in addition to the purely magnetic properties, have a large influence upon the inductive effects observed in the magnetic circuit of which they form a part, and my invention relates particularly to a method of differentiating, in whole or in part, between the magnetic and other properties, some of which latter are not yet fully known to me, and which permit me by changes in the constants of the testing circuit to readily identify in a simple manner the effects of more than one of the variables, such as chemical composition, thermal or mechanical treatment, upon which the state of the material being tested depends and which determine its usefulness for a given purpose. One of the great advantages offered by the test method, when a direct comparison is made of the test results observed before and after changing the constants of the test circuit, is that the effects of shape of the material under test are rendered largely negligible.

Figure 1:
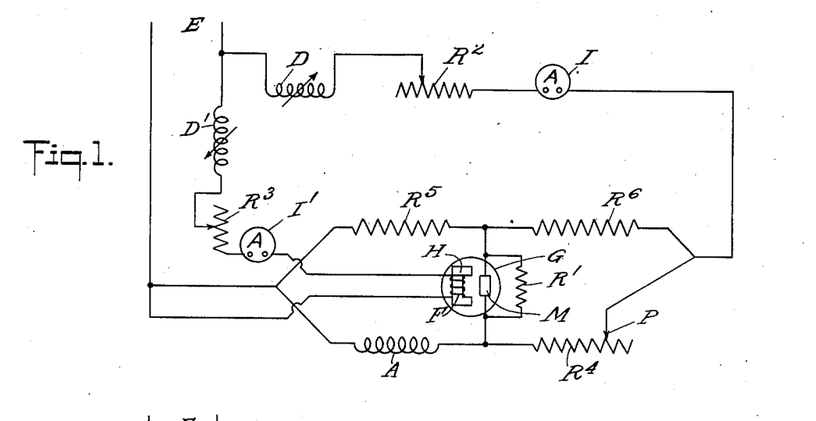
Figure 1 is a diagrammatic showing of an apparatus for employing a null method in which the measurements of the properties of a material may advantageously be made by successive tests, using a simple solenoid and adjusting for the separate tests by balancing against a resistance.

Referring to the drawings, Figure 1 shows diagrammatically a form of apparatus suitable for carrying out my method. A solenoid A is energized from a suitable source of variable electro-motive force E, through the variable inductance D and the variable resistances $R^2$ and $R^4$. Shunted across the solenoid A and the resistance $R^4$ are the fixed resistances $R^5$ and $R^6$. A galvanometer G, shunted by a resistance $R'$ for the purpose of regulating its sensitivity, is inserted so as to bridge the junction points of the fixed resistances $R^5$ and $R^6$, and of solenoid A and resistance $R^4$ respectively. The galvanometer G is preferably an electro-magnetic moving coil galvanometer with its field winding F separately excited from any suitable source such as E, through the adjustable inductance D' and the adjustable resistance $R^3$. The field core, H, of the galvanometer may be of solid or laminated material. For some purposes I prefer to have this core of solid material It will be apparent to those skilled in the art that an adjustment may be made of the variable resistances and inductances associated with solenoid A and galvanometer G, so that no current flows through the galvanometer moving coil, and hence there is no deflection. If now a specimen of material, magnetic in character, is inserted within solenoid A a deflection usually occurs. This deflection can be reduced to zero by varying resistance $R^4$ by means of slider P. The variation in position of slider P from its position for zero deflection with a standard specimen in solenoid A to that for a test specimen in solenoid A, is characteristic of a difference in the combined magnetic and electrical properties of the different specimens. My particular method of test consists in successively so varying the reactance of the circuit, for any specimen in solenoid A, that the current flowing through the moving coil of galvanometer G is influenced, first, by the combined electrical and magnetic properties of the material and, second, by a change in, and characteristic of, but one of the observed properties, as for example the magnetic one.

I find that in carrying out a test as above described of ferro-magnetic materials, the use of variable or alternating magnetomotive forces offers great advantages in obtaining a satisfactory correlation with the mechanical characteristics. The form of test employed may be called a magnetic one, but actually the magnetic characteristics observed under it are modified by and in some considerable degree depend upon the resistance of the material. That is, due to the materials ordinarily tested not being laminated, the eddy currents generated therein by the variable magnetomotive force affect the magnetic phenomena arising from permeability and hysteresis, and these eddy currents in turn are influenced as to their magnitude by the electrical resistance. I wish to point out here that the electrical resistance effects to be observed as the result of the generation of eddy currents by the action of a variable magnetomotive force are not necessarily closely related to the electrical resistance observed under the usual methods of measuring electrical resistance, since other factors or groups of factors, some of which are not as yet fully understood by me, enter.

In the practical use of the apparatus shown in Fig. 1, I adjust first the value of the magnetizing and field currents to the desired degree, and insert a standard specimen of known characteristics in the solenoid A. Then with slider P on the middle point of resistance $R^4$, I adjust the variable inductances D and D' until the galvanometer deflection is zero. The standard specimen is then removed from the solenoid and the test specimen inserted. If the galvanometer moving coil is deflected, and adjustment is made with the slider P, sufficient to bring about a zero deflection, the amount of movement of slider P from its zero point of reference I find to be a measure of certain combined magnetic and electrical properties of the specimen. If now, for this same specimen, the reactance of the test circuit is varied by readjusting the variable inductance D to a predetermined value, the slider P in turn requires readjustment to again bring about zero galvanometer deflection. This latter amount of movement of P from its zero point of reference is again a measure of the combined magnetic and electrical properties of the specimen, but with the difference that as a result of the change in reactance one of the observed properties has undergone a change in value.

The theory of operation of the apparatus shown in Fig. 1 is as follows:

The galvanometer deflection for any test specimen, and consequently the adjustment of the slider P required, depends upon the relative time displacement of the galvanometer field and the electromotive drop across the moving coil, as well as upon the magnitude of this electromotive force. When the drop across the galvanometer moving coil is in phase with the field the deflection is a function of the characteristics of the specimen as regards permeability; when the drop is in quadrature with the field the deflection is a function of the characteristics of the specimen as regards watt loss. For any pair of intermediate phase displacements the deflection in each case is a function of both the permeability and watt loss. The watt loss is the sum of the losses due to hysteresis and eddy currents and is here considered as a characteristic magnetic property of the specimen.

There is another aspect of the effect of the eddy currents generated in the specimen which I prefer to consider as typical of its electrical properties. The magnitude of such eddy currents is very largely determined by the electrical conductivity of the specimen. They exercise a shielding effect which tends to confine the magnetization to the outside regions of the specimen and in this way limit the total flux induced. Under any given magnetomotive force conditions their influence in determining the effective cross-section is a constant. A change in reactance of the moving coil circuit, therefore, affects only the magnetic properties observed, as these are defined above.

Figure 2:
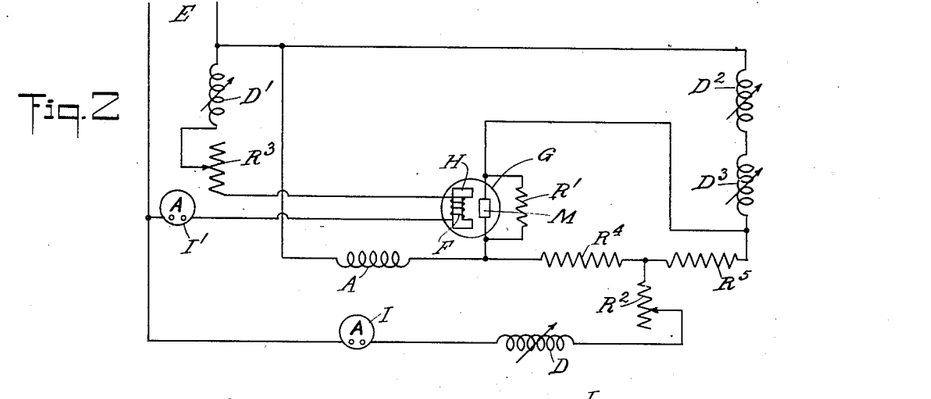
Figure 2 is a diagrammatic showing of an apparatus for employing a null method in which the measurement of the properties of a material may advantageously be made by successive tests, using a simple solenoid and adjusting for the separate tests by balancing against an inductance.

Figure 2 illustrates a modification of the arrangement shown in Fig. 1, in which adjustments are made by balancing against an inductance. Referring to Fig. 2, A represents a solenoid, connected to the source of varying electromotive force E through the variable inductance D, variable resistance $R^2$ and fixed resistance $R^4$. In shunt connection with solenoid A and resistance $R^4$ are fixed resistance $R^5$ and variable inductances $D^2$ and $D^3$, arranged for fine and coarse adjustment respectively. An electromagnetic moving coil galvanometer G bridges the resistances $R^4$ and $R^5$. A resistance $R'$, for varying its sensitivity, is shunted across the galvanometer G. The field F of the galvanometer is energized from the source E through the variable inductance $D'$ and variable resistance $R^3$. I and I' represent ammeters in the solenoid and galvanometer field circuits respectively.

The manner of using the apparatus shown in Fig. 2 is quite similar to that in Fig. 1. The apparatus is calibrated initially for a standard specimen, once for all, and the test specimen inserted in solenoid A. The galvanometer deflection is brought to zero by means of the graduated inductances $D^2$ and $D^3$. The second reading is made for a change in reactance effected by changing the setting of the variable inductance D, the inductances $D^2$ and $D^3$ being again adjusted for a galvanometer zero.

Figure 3:
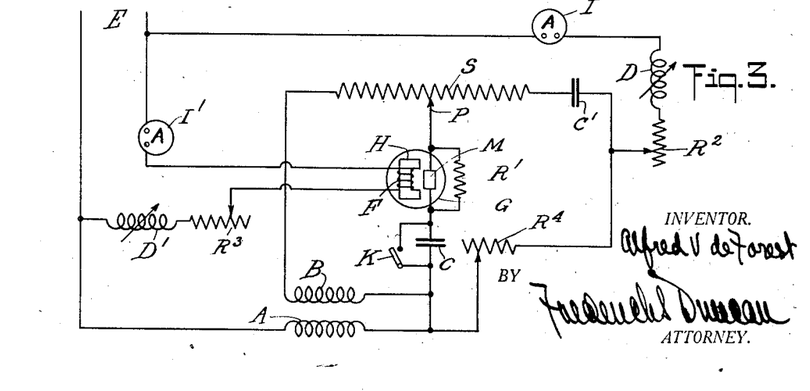
Figure 3 is a diagrammatic showing of an apparatus for employing a null method in which the measurement of the properties of a material may advantageously be made by successive tests, using a solenoid having primary and secondary windings and adjusting for the separate tests by balancing against a capacitance.

To obtain greater sensitivity than is possible with a simple solenoid, and to obtain other benefits, a solenoid comprising a primary and secondary winding may be used as in Fig. 3. Here E represents as before a suitable source of varying electromotive force, to which is connected the primary coil A in series with the variable inductance D and the variable resistances $R^2$ and $R^4$. The secondary coil B of the solenoid is connected in shunt relation to $R^4$ in series with the condenser $C'$ and the uniformly wound slide wire resistance S. The moving coil M of the galvanometer G is connected as shown between the common connection of the solenoid windings A and B and the sliding contact P of the slide wire S. In series with the moving coil M is a condenser C. Across the terminals of C is arranged a key K by means of which C may be cut in or out of the galvanometer circuit. The field F of the galvanometer is energized as before from the source E through the variable inductance $D'$ and the variable resistance $R^3$. I and I' represent ammeters in the magnetizing and galvanometer field circuits respectively.

In the use of the apparatus shown in Figure 3, the galvanometer is brought to zero deflection, with a standard specimen in the solenoid A, B by adjustment of resistance $R^4$ and sliding contact P. During this adjustment, which is made once for all, the key K is closed so as to short-circuit the condenser C. With key K still closed, the standard specimen is removed from the solenoid and a test specimen inserted. If the galvanometer moving coil deflects, it is adjusted to zero by means of sliding contact P. The second reading is carried out after key K is opened, placing the condenser C in series with the galvanometer moving coil.

Figure 4:
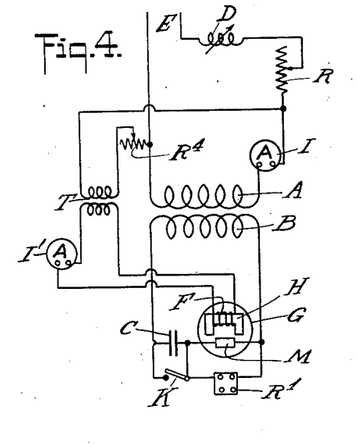
Figure 4 is a diagrammatic showing of an apparatus for employing a simple deflection method using a solenoid having primary and secondary windings in which the comparison of the properties of materials may most advantageously be made by successive tests.

In Figure 4 is shown a simple form of apparatus for carrying out my test, employing a deflection method in which the change in reactance is effected through introducing capacitance only into the circuit. Referring to Figure 4, a solenoid comprising the primary coil A and secondary coil B is energized from a suitable source of electro-motive force E, the secondary coil B being in circuit with the moving coil M of a galvanometer G and also a condenser C. Shunted across the condenser C and the galvanometer G are the key K and resistance $R'$ respectively. An adjustable inductance D, a variable resistance R and also an ammeter I are in the primary circuit and the galvanometer circuit may conveniently include a transformer T and also an adjustable resistance $R^4$.

In testing the magnetic and electrical properties of a body, it may be introduced into the solenoid formed by the primary and secondary coils A and B and the reading of the galvanometer taken with the circuit closed through the key K. The key K may then be opened, whereby capacitance is introduced into the circuit and the reactance consequently varied, whereupon another reading of the galvanometer may be taken. For purposes of comparison with a standard specimen, the properties of the standard specimen may also be determined in a similar manner and comparison of the respective results of the tests of the two specimens made.

Figure 5:
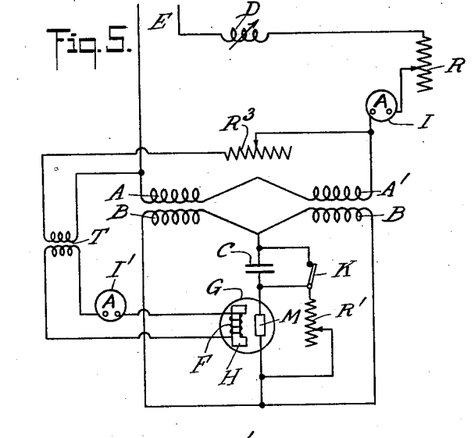
Figure 5 is a modification of the form shown in Figure 4 and in which two specimens may be inserted simultaneously, the one balanced against the other to increase the accuracy of reading small differences.

When more accurate measurements are desired than are possible with a simple deflection method a pair of solenoids may be used as illustrated in Figure 5. Referring to Figure 5, E indicates a source of electromotive force, A and $A^1$ are two similar primary coils of the solenoids, B and $B^1$ are two similar secondary coils of the same solenoids, R is a regulating resistance for varying the magnetizing current, D is a variable inductance in this circuit, I is an ammeter to indicate the magnetizing current, $R^3$ a resistance to regulate the field F of the galvanometer G acting through the transformer T and measured by the ammeter I¹. The resistance R¹ is shunted with the galvanometer G and regulates its sensitivity. The key K is shunted with the condenser C whereby capacitance may be introduced into the secondary circuit to alter the reactance of the latter whenever desired.

In practice two similar specimens may be introduced, one in each solenoid and readings taken with the condenser in and out of the secondary circuit. One of the specimens may then be removed and an unknown specimen introduced in its place and readings similarly taken. A comparison of the two sets of readings will then indicate the relative values of the two properties that are the subject of the test.

Figure 6:
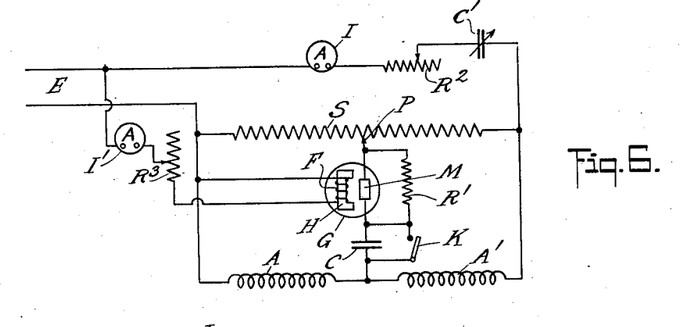
Figure 6 is a diagrammatic representation of another form of apparatus for simultaneous comparison of two specimens employing a null method and adjusting by means of one slide wire.

If still greater accuracy is needed, a null method may be used as shown in Figure 6. The different null methods allow current indicators such as the vibration galvanometer being used in place of the galvanometer with separately excited field.

Referring to Figure 6, A represents a solenoid adapted to receive a standard specimen of material, such as a rod circular in section, and A¹ a second solenoid similar in number of turns and dimensions to A adapted to receive a second or test specimen of material, similar in form to that in solenoid A, the properties of which are to be determined. Solenoids A and A¹ are connected in series with the regulating rheostat R² and variable condenser C' across the terminals of an electrical supply circuit energized from a source of electro-motive force E, which may be assumed to be alternating in character and of any suitable frequency. Connected across the terminals of AA¹ and also in series with the source E, condenser C' and rheostat R² is a slide wire resistance S which is uniformly wound from end to end. Bridged between the inner terminals of AA¹ and a sliding contact P engaging with S is a condenser C and the moving coil M of a galvanometer G or other indicating instrument of suitable type. The galvanometer G which I prefer to use is of the iron core type in which the moving coil M is mounted so as to rotate about a fixed iron core arranged so as to concentrate the magnetic field due to a separately excited field F. Shunted across the terminals of the moving coil M is a shunting resistance R¹ for controlling the sensitivity of the galvanometer and shunted across the terminals of the condenser C is a key K by means of which the condenser may be placed in series with the moving coil circuit or shunted with a circuit of zero resistance at will. F, the separately excited field of the galvanometer, is connected across the terminals of the source of electro-motive force E in series with the adjustable rheostat R³. I and I¹ represent ammeters for reading the respective currents in the solenoidal system AA¹S and the galvanometer field respectively.

Considering the duplex circuits made up of the rheostat R² and the solenoids A and A¹ and of the rheostat R² and the slide wire resistance S respectively, and closing the short-circuiting key of the condenser C, it will be evident from the configuration of the circuit that when no iron or other magnetic materials are within the solenoids A and A¹, and the field F of the galvanometer is energized, that the galvanometer will indicate zero when the sliding contact P is at the middle point of the slide wire resistance S, since the galvanometer will then be connected across points of equal potential. This zero indication will persist if the key K is opened. If a standard specimen of magnetic material is placed in the solenoid A and an exactly similar specimen is placed in A¹, the galvanometer will continue to indicate zero, when P is at the middle of S, whether K is open or closed. If however one of the similar specimens is removed and a dissimilar specimen substituted for it, it will be found necessary, to obtain zero indication on the galvanometer, to shift the position of the contact P, and furthermore this position of the contact P is a function of the position of the key K, or in other words depends upon whether the condenser C is or is not in the galvanometer circuit. The amount by which the contact P is shifted from the center of the slide wire resistance S when the key K is closed so as to short-circuit the condenser is used by me to indicate a certain combination of the various physical and magnetic properties of the specimen with a certain property or group of properties predominating. The amount by which the contact P is shifted when the key K is opened so as to place the condenser in series with the moving coil M of the galvanometer is utilized to indicate a certain combination of physical properties with a different property or group of properties predominating.

Figure 7:
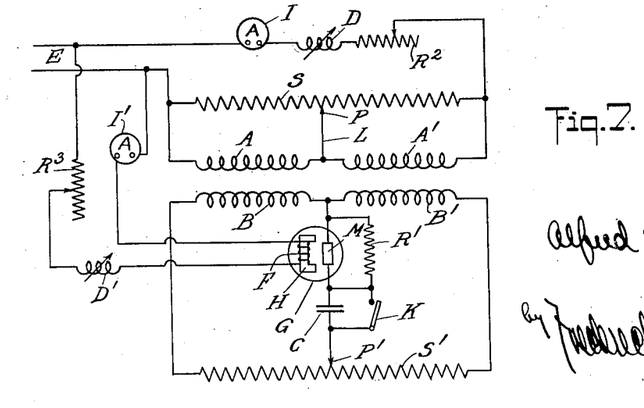
Figure 7 is a modification of the apparatus shown in Figure 6 in which the adjustments of two slide wires are used in connection with solenoids having primary and secondary windings.

Figure 7 is a modification of the apparatus in which the adjustments of two slide wires S and S¹ are used in connection with solenoids having both primary and secondary windings. Referring to Figure 7, E represents as before a source of electromotive force to which is connected, through the ammeter I variable inductance D and adjustable rheostat R² a slide wire rheostat S. Bridged across S are connected in series the primary windings A and A¹ of solenoids. The secondary windings of these solenoids are represented by B and B¹ respectively. An adjustable connecting lead L is connected at one end to the inner terminals of the windings A and A¹ and at the other end has a sliding contact P which can make electrical contact with any portion of the slide wire resistance S. The secondary windings B and B¹ of the solenoids bridge a second slide wire resistance S¹. Connected between the inner terminals of the solenoidal windings B and B¹ and the slide wire rheostat S¹ is an electrical connection terminating in the slide wire contact P¹. This electrical connection carries in series the moving coil M of the galvanometer G and a condenser C. Shunted about the moving coil M is a resistance R¹ for controlling the sensitivity of the galvanometer and shunted about C are connections in series with the key K by means of which the condenser may as before be placed in series with the moving coil or shunted with a circuit of zero resistance at will. The field F of the galvanometer G is connected through the ammeter I¹, variable inductance D' and adjustable rheostat R³ to the source of electromotive force E.

The operation of the device described in Figure 7 is as follows: A standard specimen of known properties is placed in the solenoid A, B and a test specimen of unknown properties in the solenoid A¹B¹. The resistance R² is adjusted until the proper magnetizing current is flowing in the primary circuit and the current in the field strength. Then, with the condenser C short-circuited by means of the key K, positions are found for the slide wire contacts P and P¹ such that the galvanometer indication is zero. Following this, positions are found for P and P¹, when the key K is opened, such that the galvanometer indication is again zero.

When the condenser is short-circuited and there are no specimens in the solenoids, there are to be found any number of positions of the slide wire contacts P and P¹ which give zero galvanometer indication. Similarly, when the condenser is in series with the moving coil of the galvanometer, there are any number of positions of P and P¹ which give zero galvanometer indication. There is however but one set of positions for P and P¹ at which the galvanometer indicates zero, for any definite materials in the solenoids, when the condenser is either in series with the moving coil or short-circuited.

Figure 8:
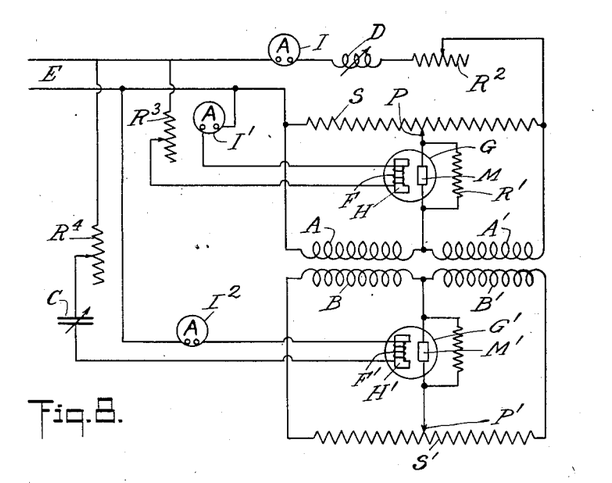
Figure 8 is a modification of the apparatus shown in Figure 7 in which two galvanometers are employed to obtain simultaneous adjustments of the slide wire contacts.

In Figure 8 is shown a further modification of the arrangement shown in Figure 7 in which two galvanometers, instead of one, are employed. As before E represents a source of electromotive force to which is connected through the ammeter I, variable inductance D and resistance R² a slide wire S. Bridged across S are connected in series the primary windings A and A¹ of solenoids. Connected between the slide wire contact P and the inner terminals of A and A¹ is a galvanometer G, having a movable coil M and a field F, which is separately excited from the source E through the ammeter I¹ and the adjustable rheostat R³. Shunted across the moving coil of the galvanometer is a resistance R¹ for controlling galvanometer sensitivity. The secondary windings B and B¹ of the solenoids are shunted by the slide wire resistance S¹. Connected between the slide wire resistance contact P¹ and the inner terminals of the windings B and B¹ is a galvanometer G¹ having a movable coil M¹ and a field F¹, which latter is excited from the source E through the ammeter I², variable condenser C and adjustable rheostat R⁴.

In the operation of the device shown in Figure 8, the slide wire contacts P and P¹ are adjusted until the galvanometers G and G¹ indicate zero current in the respective circuits to which they are connected. I have found that with two galvanometers connected in this manner I can at the same time make adjustments so that two independent variables of the material inserted in the solenoid A¹B¹ may be determined when a standard specimen is inserted in the solenoid AB.

Figure 9:
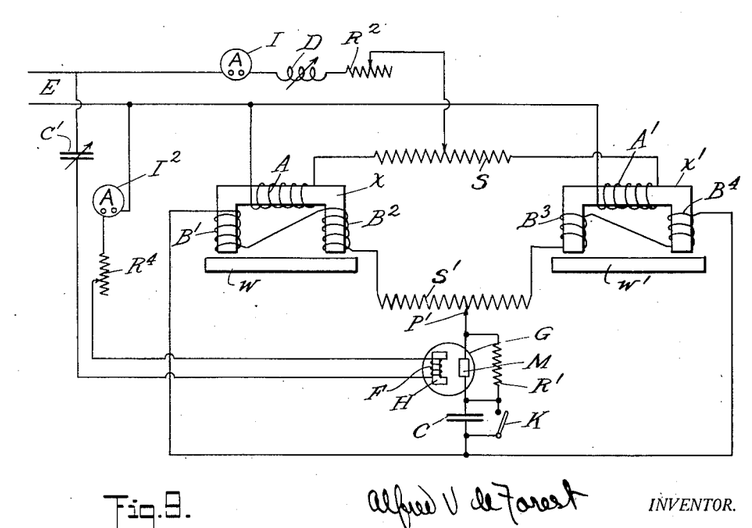
Figure 9 is a further modification of the apparatus shown in Figure 7 in which the form of the electrical connections vary somewhat and in which yokes of magnetic material having primary and secondary windings are employed in place of solenoids.

In Figure 9 is shown a modification of the construction and electrical connections of the apparatus shown in Figure 7 in which electro-magnets are used in place of the solenoids AB and A¹B¹ in order to increase the strength of the magnetic fields acting upon the standard and test materials in the event that they are feebly magnetic or diamagnetic, or in case the body cannot readily be introduced into the core of a solenoid. Here E represents the source of electromotive force to which are connected in parallel, through the ammeter I, variable inductance D, adjustable rheostat R², slide wire resistance S and magnetizing windings A and A¹ of the magnetic yokes X and X¹. The yokes X and X¹ which are U-shaped, are each wound upon their core arms with secondary windings, those associated with the yoke X being designated B¹ and B² and those associated with yoke X¹ being designated B³ and B⁴. The secondary windings for each yoke are so connected with each other that upon a change in the current flow in the primary winding associated therewith the induced electro-motive forces are additive. As shown an electrically closed circuit is made up of the coils B¹, B², B³ and B⁴, in additive connection, with the slide wire resistance S¹. The galvanometer G is connected between the adjustable slide wire contact P¹ and the common connection to B¹ and B⁴, in series with the condenser C which may be shunted by the closed circuit controlled by the key K. Bridged across the moving coil M is the usual resistance R¹. The field F of the galvanometer is connected through the ammeter I² regulating rheostat R⁴ and variable condenser C' to the source of electromotive force E.

In the operation of the apparatus of Figure 9, W represents the standard specimen and W¹ the test specimen. These two specimens are applied so as to bridge the core arms of the yokes X and X¹, so that upon current flowing in the magnetizing windings A and A¹ the specimens are magnetized to the same general effect as if they were inserted within solenoids. The reactions between the magneto-motive force effects induced in these specimens on the electrical circuits associated with the core arms, for the two cases of the condenser in and out of the galvanometer circuit, give a measure of the properties of the specimen W¹ with respect to W. It will be apparent that if W and W¹ are non-magnetic the eddy-current effects induced in these specimens will have an inductive effect of their own on the windings of the core arms, even if the material be non-magnetic.

The principle underlying my invention involves the successive altering, in some definite manner, of the reactance of the test circuit and deducing from a plurality of readings successively taken, more than one mechanical characteristic of the material under test. Referring to Fig. 1, we have here a bridge circuit, the four arms of which are R⁵, R⁶, A and R⁴. In the absence of ferromagnetic material in the solenoid A, the wave form of the current in this solenoid is sinoidal, if the voltage wave form is sinoidal. When a specimen of magnetic material is inserted in A, however, the current wave form is no longer sinoidal, due to hysteresis and eddy current effects. That is, there is distortion and harmonics exist and the observed electromotive force between the galvanometer terminals is not sinoidal.

The galvanometer of Fig. 1 is of the electromagnet moving coil type and serves to measure or indicate the difference of potential existing. This galvanometer, however, can only detect or give a measure of the component of the electromotive force in phase with the galvanometer field. This field may be either sinoidal or distorted. The galvanometer does not necessarily indicate that the electromotive force is zero, when there is no deflection of the moving coil. For example, if an electromotive force is present but is in quadrature with the magnetic field, an absence of potential difference is indicated. But a change in the electrical constants of either the field circuit or any part of the bridge circuit would upset this condition of quadrature and a deflection would be immediately noted.

Let us suppose that with a test specimen in solenoid A, the slider P is adjusted so that the deflection is zero. As stated above, this may indicate actual zero potential difference but more generally it indicates that the component of the electromotive force in phase with the galvanometer field is zero. Now if we readjust the reactance of any part of the circuit, the component of the electromotive force in phase with the galvanometer field is no longer zero and a further readjustment of P is required. The component of the electromotive force in phase with the field differs in magnitude in each case not in accordance with the phase displacement alone but also in accordance with the distorted wave form of the electromotive force acting on the moving coil circuit. That is, both the phase displacement and the magnitude of the component in phase are functions of the properties of the materials in the solenoid A.

It will at once be seen that the test procedure resolves itself into a measurement of the mutual reaction of two wave forms. In effect, this constitutes a comparison of such wave forms and this comparison is direct when, as in Fig. 1, the flux wave of the galvanometer field and the electromotive force wave impressed on the moving coil are in phase, and indirect when the flux wave and the electromotive force wave are only partially in phase. The basis of comparison may also consist as in Fig. 7 in measuring the mutual reaction of a flux wave and an electromotive force wave, the latter of which is equally a function of the phase difference of the electromotive forces induced in the standard and test specimen solenoid secondary windings. It is apparent that by manipulation of variable inductances or variable condensers located in either the galvanometer field or magnetizing coil circuits, or both, or of a condenser in the galvanometer moving coil circuit proper, that the wave forms being compared may be placed in any desired relation to each other. I may explain here, in connection with Fig. 7, although not specific to it, the statement made above that I can so adjust the conditions of experiment that the particular magnetic phenomena which I have found indicative of cold working, for example, may be made similar in degree for two successive test specimens, leaving the difference with respect to another property to be the more clearly demonstrated under a second condition of experiment. It is possible, for instance, under a suitable adjustment of values of inductances D and D′, to find by trial the relative positions at which P and P′ co-act with the slide wires S and S′ so that in one final position of these contacts, two or more successive specimens of the same order placed in solenoid A′B′ shall exhibit the same or very closely the same magnetic phenomena with the condenser switch K in one of its two positions, i. e., either short-circuiting or open-circuiting the condenser, although their inherent magnetic characteristics, as distinguished from their effective or apparent magnetic characteristics, may be dissimilar. Upon condenser switch K being then placed in the alternate position, thus modifying the test circuit reactance, magnetic characteristics of the specimens as to another quality than the first may be the more readily observed.

It is immaterial whether a change in the reactance of the test circuit is effected by a readjustment of some element of the current supply circuit, as inductance D in Fig. 1, or by introducing capacitance in the galvanometer moving coil circuit as in the apparatus shown in Fig. 5. In each case a balance once obtained is upset by a change in the reactance of the test circuit and a readjustment of some of the elements of the circuit is required to obtain a balance. Again, it is not essential, in any of the test procedures described, whether or not a bridge method is used, that a balance or zero deflection be obtained. The apparatus may indeed be adjusted for galvanometer balance and the deflection observed for change or changes in test circuit reactance effected by the insertion of a test specimen into the magnetizing solenoid or by bringing a test specimen into contact with a magnetizing yoke.

Nor is it essential that the test specimen be magnetic in character in order to derive information as to some of its physical or mechanical characteristics. If such specimen is metallic, the eddy currents induced therein under the influence of a magnetomotive force will effect a change in the test circuit reactance and thereby modify the initial phase relations. While not an essential element of my invention, I find that in the use of an electromagnetic moving coil galvanometer there is some advantage to be gained particularly with respect to sensitivity, by having the field core of solid instead of laminated material, as this effects a certain amount of flux distortion and thereby introduces harmonics into the test circuit. Such harmonics are of assistance in magnifying certain characteristics of the test material and so facilitate their identification. I should be understood however that it is not necessary to always use an instrument of the electromagnet moving coil type, as other indicators such as a vibration galvanometer are of utility, particularly where a standard and a test specimen are compared, and a null method of measurement is desired. It is pointed out above, with special reference to Fig. 7, that the electromotive force wave acting on the moving coil M of galvanometer G is a function of the phase difference between the electromotive forces generated in the secondary windings of the standard and test solenoids. Now, instead of comparing the resultant electromotive force wave with a flux wave of a galvanometer field, we may use a telephone or vibration galvanometer in place of the electro-magnetic galvanometer, directly connecting such telephone or vibration galvanometer in place of the coil M. This amounts to comparing with each other the electromotive force waves from the solenoid secondaries. Again, it is not necessary, with any type of indicator, to take two consecutive readings on a single instrument. I may, as in Fig. 8, employ two galvanometers to great advantage with respect to time taken to make observations.

While I have above set forth my present understanding of the reactions taking place under my mode of test, and the benefits to be gained thereby, I have also pointed out that some of the factors or groups of factors involved are not as yet fully understood by me. It is probable that these will not be entirely clear until a very large amount of experimental work has been completed. For example, some of the test results obtained which are designed to enable conclusions to be drawn as to the resistance characteristics of the material, give results which do not check up with the results of resistance tests made in the usual manner, i. e., by measuring the drop in potential under direct current. I believe that the reason for this lies in the fact that there is not necessarily any direct connection, except in part, between the resistance offered to the passage of current through the material as a whole, and that which affects the magnitude of the eddy current flow. For example, the intracrystalline resistance of a material might be very low, while the intercrystalline resistance might be very high. My method of test makes it possible to measure, at least approximately, this important quantity, intracrystalline resistance, and hence to draw conclusions as to the size of grain.

In describing the methods of conducting tests by means of the various forms of apparatus shown, I have referred to the comparison of the effects produced by a change in test circuit reactance, when both a test and standard specimen are included in the testing circuit. I am not, however, to be understood as meaning that the precise steps outlined for the conduct of the test are necessary or in commercial practice desirable. It is obvious that if desired the apparatus can be standardized or calibrated either empirically or from its known constants.

A simple example as might take place in practice is given:

Let us assume that we have a charge of drills forged to shape from a commercially uniform lot of 18% tungsten high speed steel bar, and that the drills as thus shaped are substantially uniform in their characteristics, and that all that remains to be done to finish them is to harden and draw them. By an actual test it is determined that there is a range of temperature for quenching and a range of temperature for drawing which will result in a drill satisfactory for the purposes in view. The next step would be to quench a number of these drills at various temperatures within and in the neighborhood of the range that has been found to be suitable, and drawing them all at the same temperature within or close to the known desirable drawing range. The magnetic test is then applied to these specimens, and the phase angle of one circuit so adjusted that specimens read alike in respect to that selected magnetic property. Any other magnetic measurement which indicates a difference between these specimens may be used to indicate the difference between the drawing temperatures. This is done by using the second circuit and measuring with a different phase relation between bridge and galvanometer field. For purposes of graphical representation a plotting may be made of the magnetic readings of these two circuits. It will be found that the series of specimens quenched from different temperatures and drawn to the same temperature will lie along a line characteristic of equal draw, and in general a change in the drawing temperature will cause the specimens to lie along a different line. A further set of specimens is now prepared in which the quenching temperatures are alike, but the drawing temperatures vary for the desired commercial range. The magnetic characteristics of these specimens will lie along a line of equal quench, but of varying draw, and under proper differences of the circuit adjustment, these lines will not coincide. A plot has therefore been prepared showing the separate effects of both quenching and drawing treatment, and the testing of specimens whose quenching and drawing treatment is unknown may be proceeded with. The position on the plot of the readings of the unknown specimens will indicate whether there is any variation in either the quenching or the drawing from the standard which has been established. In practice there is, of course, a variation both in the quench and in the draw which is commercially acceptable. The limits may be set by practical experience as to what deviations generally cause too much deterioration of desirable mechanical properties, and those drills which lie within the established limits may easily be separated from those lying without these limits. Furthermore, the cause of variation may be recognized and the proper remedy applied.

Having thus described my invention, I claim:

1. In the method of differentiating between the several mechanical properties of a metallic body, the steps which comprise the determination of the effects of said body on the reactance of a testing circuit at a plurality of different values of initial reactance.

2. In the method of differentiating between the several physical properties of a metallic body, the steps which comprise the determination of the effect of said body on the reactance of a testing circuit containing capacitance at a plurality of different values of initial reactance.

3. In the method of differentiating between the several physical properties of a metallic body, the steps which comprise the determination of the effect of said body, on the reactance of a testing circuit containing inductance at a plurality of different values of initial reactance.

4. In the method of determining physical properties of a metallic body, the steps which comprise determining the effect of said body on the reactance of a testing circuit at a plurality of different values of reactance, one of said values being dependent upon and another independent of the existence of capacitance in said circuit.

5. The method of differentiating between the several mechanical properties of a metallic body which consists in subjecting the body to the effects of a changing magnetomotive force and measuring the influence of such body upon the reactance of a testing circuit, when the electrical constants of this circuit are caused to vary in a known manner.

6. The method of distinguishing between the several mechanical properties of a metallic body which consists in subjecting the body to the effects of a changing magnetomotive force and measuring the relative inductive effects when the reactance of the test circuit is caused to vary by means independent of change in the properties of the specimen.

7. The method of differentiating between the several mechanical properties of a magnetic body which consists in subjecting the body to the effects of a changing magnetomotive force and measuring the change in inductive effects which occurs when the reactance of the test circuit is varied.

8. The method of determining mechanical properties of a metallic body which consists in subjecting the body to the effects of a changing magnetomotive force and measuring the influence of such body upon the reactance of a testing circuit, when the inductance of this circuit is compensated for in whole or in part by capacitance.

9. The method of determining mechanical characteristics of a metallic body which consists in variably magnetizing said body while it is associated in inductive relation with a circuit containing inductive reactance, measuring the effect of said body on said inductive reactance and again measuring the effect of said body on the reactance of said circuit when the said inductive reactance is effected by capitance.

10. The method of differentiating between the several mechanical properties of a metallic body in comparison with similar properties of a known specimen of the same size and shape which consists in measuring the relative effects of said body and specimen on the reactance of a testing circuit while variably magnetized in inductive relation with said testing circuit by means independent of change in the properties of the specimen, changing the reactance of the said testing circuit and similarly measuring the effects of said body and specimen on the reactance as thus changed.

11. The method of determining a plurality of properties of a metallic body which consists in variably magnetizing said body, using the body as an inductive coupling to a circuit containing inductive reactance, measuring the effect of said body on said reactance, changing the value of said reactance independently of said body, again using the said body as an inductive coupling to said circuit, and measuring the effect of said body on said reactance as thus changed.

12. The method of determining two of the properties of a magnetic body which consists in using the body as an inductive coupling to a test circuit containing reactance, measuring the effect of said body on said reactance, opposing said reactance by capacitance, and again measuring the effect of said body on the reactance of said testing circuit while thus opposed.

13. The method of differentiating between two of the properties of a magnetic body in comparison with similar properties of a known specimen of the same size and shape which consists in measuring the relative effects of said body and specimen on the reactance of a testing circuit when said reactance is in a condition to respond to a particular property of said bodies and while the said bodies are variably magnetized in inductive relation with said testing circuit, changing the reactance of said testing circuit so that it becomes responsive to another property to be measured and similarly measuring the effects of said body and specimen on the reactance as thus changed.

14. The method of determining two of the properties of a metallic body, the remaining properties of which are known, which consists in using the said body as an inductive coupling to a test circuit, measuring the effect of said body on the impedance of said circuit, changing the impedance of said test circuit, and again measuring the effect of said body on the impedance of said circuit as thus changed.

15. The method of determining the mechanical characteristics of a magnetic body which consists in variably magnetizing the said body, thereby inducing an electromotive force in a test circuit containing reactance not dependent for its value on said body, measuring the effect of said body on said reactance, changing the reactance of said test circuit, again measuring the effect of said body on the reactance of said test circuit, carrying out the same steps with a body of known mechanical characteristics, and comparing the results obtained in the case of the first mentioned body with the results obtained in the case of the body of known characteristics.

16. The method of differentiating between the several mechanical characteristics of a metallic body which consists in variably magnetizing said body while it is associated in an inductive relation with a testing circuit containing reactance, measuring the effect of said body on said reactance, changing the reactance of the said testing circuit and again measuring the effect of said body on the reactance as thus changed.

17. Means for determining the mechanical characteristics of a metallic body comprising in combination a circuit adapted to magnetize the body and a test circuit inductively coupled thereto, said test circuit containing an indicating instrument and means for changing the phase of the current in the test circuit, relative to the exciting field of the indicating instrument by varying reactance of such circuit in a known manner.

18. In an apparatus for determining the mechanical characteristics of a metallic body, means for variably magnetizing the said body, a test circuit adapted to be inductively coupled with said body and means for introducing capacitance into said test circuit.

19. In an apparatus for determining the mechanical characteristics of a metallic body, means for variably magnetizing the said body, a test circuit adapted to be inductively coupled with said body and means for introducing capacitance into said circuit to effect a change in phase.

20. In the method of differentiating between the several mechanical properties of a metallic body, the steps which comprise the determination of the magnetic effects exhibited by said body, at a plurality of initial different values of test circuit reactance.

21. In the method of differentiating between the several mechanical properties of a metallic body, the steps which comprise the determination of the magnetic effects exhibited by said body when the initial reactance of a testing circuit magnetizing the body is varied.

22. The method of determining mechanical properties of a metallic body which consists in subjecting the body to the effects of a changing magnetomotive force and measuring the interaction of two flux waves at different values of phase displacement.

23. The method of determining mechanical properties of a metallic body which consists in subjecting the body to the effects of a changing magnetomotive force and equating those components of two separate flux waves which are in phase with each other, and obtaining a measure of those flux components which are out of phase with each other.

24. A method of testing a magnetizable object which consists in placing the object in the secondary coil of a transformer, energizing the primary coil of the transformer with an alternating current, and comparing the phase characteristics of the primary current with the phase characteristics of the current induced in the secondary coil.

25. An apparatus for testing a magnetizable object which comprises a transformer within which the object is adapted to be placed, a dynamometer having a field coil in the primary circuit of the transformer and a potential coil in the secondary circuit of the transformer, and means for shifting the phase of the primary circuit.

26. An apparatus for testing a magnetizable object comprising a primary circuit for producing a magnetic field about the object to be tested, a secondary circuit comprising a test coil in the field, a dynamometer having a stationary coil in said primary circuit and a potential coil in said secondary circuit, and means for shifting the phase of the primary circuit.

27. An apparatus for testing a magnetizable object comprising a primary circuit for producing a magnetic field, a secondary circuit comprising a test coil in the field, and a dynamometer adapted to indicate the energy absorbed by the object when placed in said test coil.

28. The method of determining mechanical properties of a metallic body which consists in variably magnetizing the body and measuring the reaction between the inductive effects of such body and other inductive effects of selected time displacement.

29. The method of determining mechanical properties of a metallic body which consists in variably magnetizing the body and comparing the magnetization effects induced in or by such a body with other magnetization effects of known degree and of known phase relationship.

30. The method of determining the effects of mechanical or thermal treatment on a magnetic body which consists in variably magnetizing the body and obtaining a measure of the combined effects of difference in induction and phase of the magnetization induced in the body on other magnetization of known and adjustable character.

In testimony whereof, I have signed this specification.

ALFRED V. DE FOREST.